Jan. 3, 1939. K. L. ZERR 2,142,390
COOKING APPARATUS
Filed Aug. 7, 1936 4 Sheets-Sheet 1
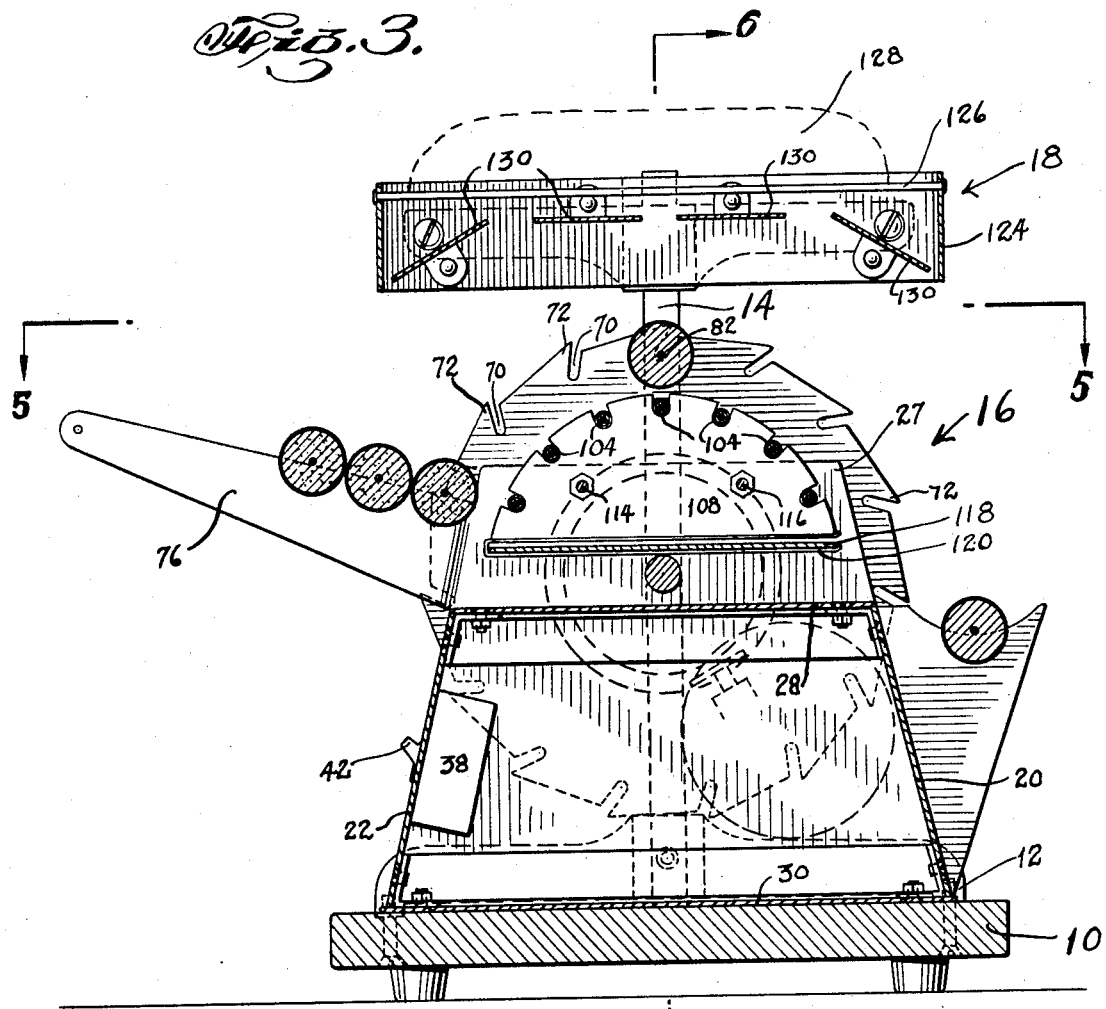
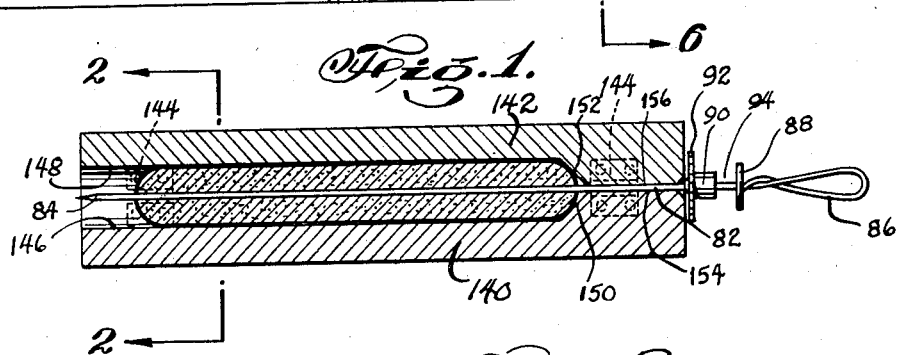
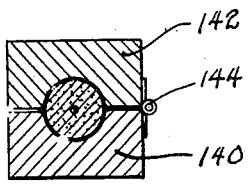
INVENTOR
KARL LEOPOLD ZERR
BY
Hammond & Littell
ATTORNEYS Jan. 3, 1939.    K. L. ZERR    2,142,390
COOKING APPARATUS
Filed Aug. 7, 1936    4 Sheets-Sheet 2
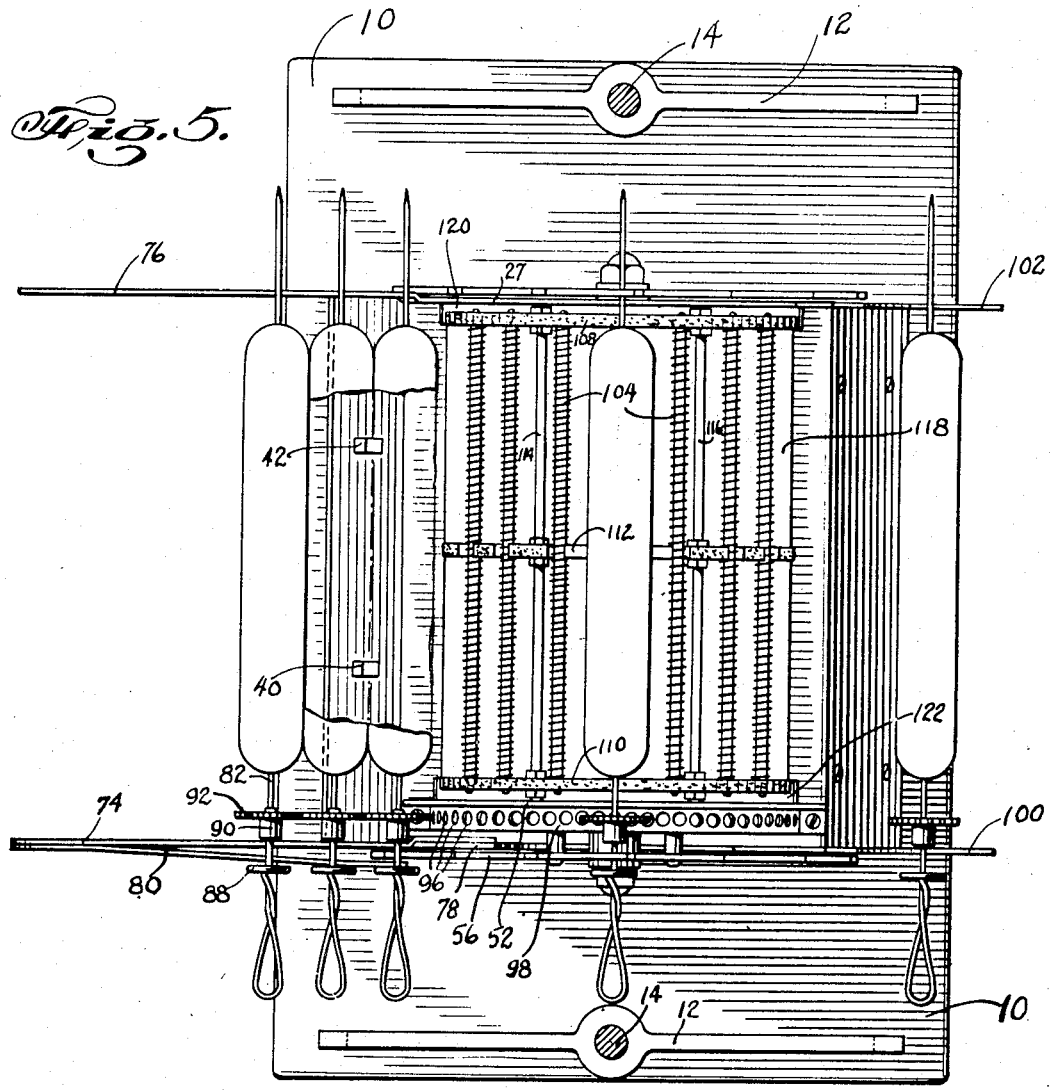
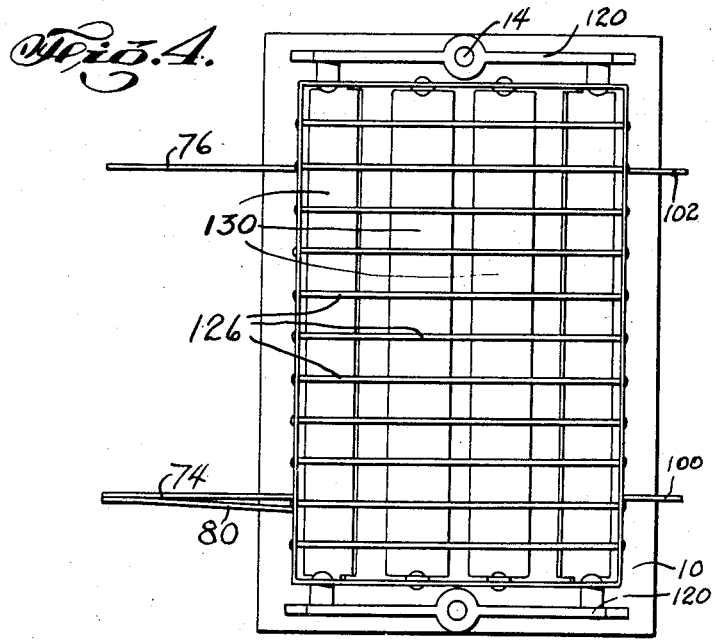
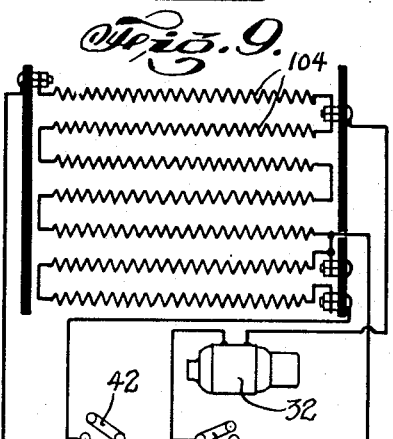
INVENTOR
KARL LEOPOLD ZERR
BY
Hammond & Littell
ATTORNEYS Jan. 3, 1939.　　　　K. L. ZERR　　　　2,142,390
COOKING APPARATUS
Filed Aug. 7, 1936　　　　4 Sheets-Sheet 3

INVENTOR
KARL LEOPOLD ZERR
BY
Hammond & Littell
ATTORNEYS

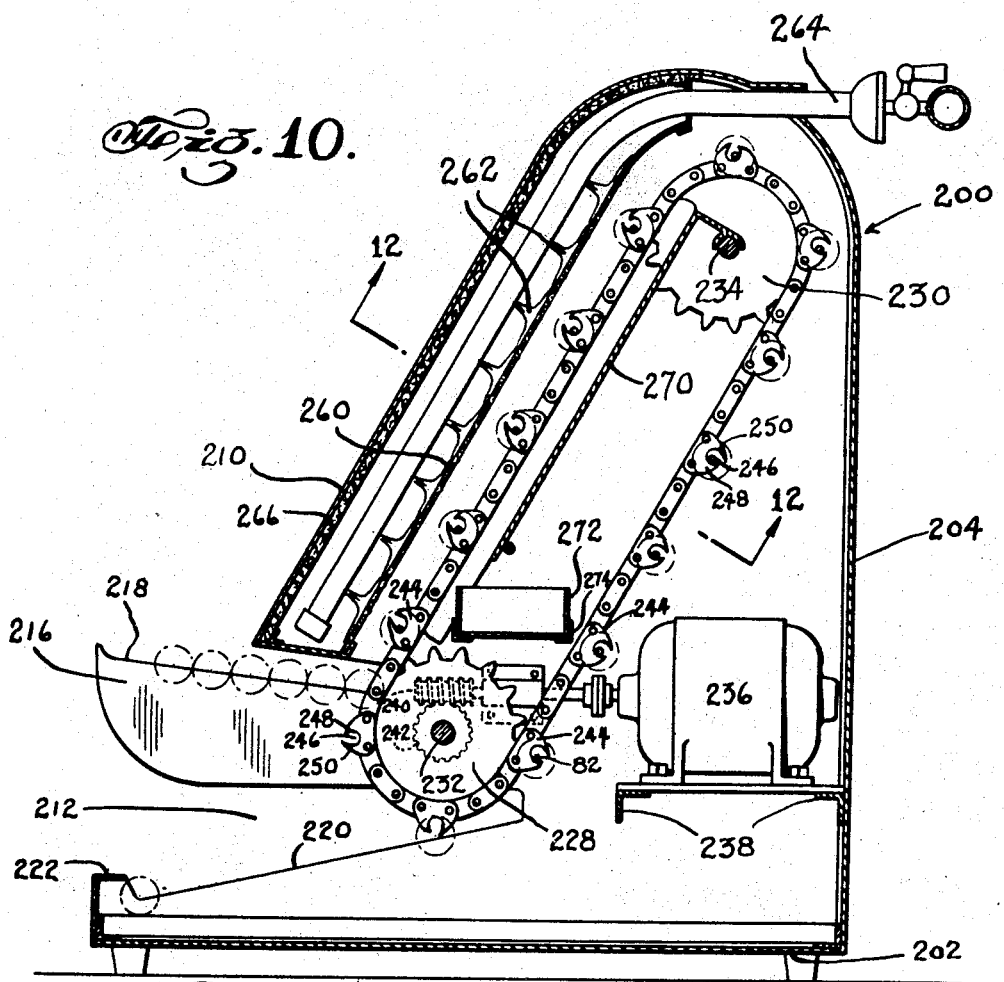
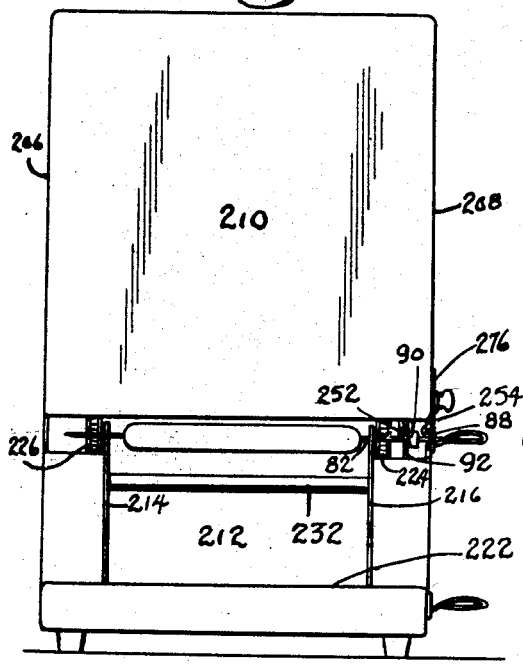
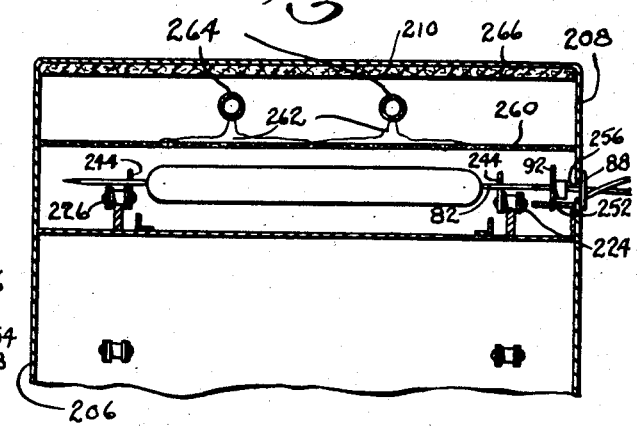

Patented Jan. 3, 1939

2,142,390

UNITED STATES PATENT OFFICE 2,142,390

COOKING APPARATUS

Karl Leopold Zerr, Brooklyn, N. Y., assignor of one-half to Nelson Littell, New Canaan, Conn.

Application August 7, 1936, Serial No. 94,749

9 Claims. (Cl. 53—5)

This invention relates to improved methods and apparatus for cooking meats and the like, and it has particular reference to the cooking of elongated objects such as frankfurters for immediate service.

Various types of apparatus for cooking frankfurters are known to the art, of which machines comprising endless conveyors having a plurality of carrying trays thereon and arranged to carry the frankfurters through a heating zone are a well known example. Despite the availability of such machines, however, it remains customary to cook frankfurters on flat grills which require lengthy preheating and cooking as well as constant attention during the cooking period to prevent burning and to secure uniform cooking of the frankfurters.

Among the objectionable features of the cooking machines heretofore employed are that they require relatively long flights of conveyors to assure satisfactory cooking without burning, and they are therefore bulky, slow and expensive. Uniformly and properly cooked products are difficult to obtain because the heating elements are positioned adjacent the sides of the conveyor, and the tops and bottoms of the frankfurters carried on the trays are subjected to less heat than the sides. Moreover, it is difficult to turn them during their travel through the machine, and they are free to curl and crack and lose their tasty juices.

A further practical objection to both of these types of apparatus is that excessive quantities of frankfurters must be cooked in advance to enable immediate serving on demand, with the result that the accumulated excess is allowed to become cold, or to dry out on a grill while awaiting orders. It is not uncommon for a dealer to close his day's business with a substantial number of unsold cooked frankfurters on hand, which must be discarded at a loss.

An object of my invention is to provide an improved method and apparatus for cooking objects such as frankfurters so that products properly and uniformly cooked on all sides may be obtained without requiring the attention of an operator.

Another object is to enable the cooking of frankfurters so that cracking thereof and substantial loss of juices during the cooking operation are avoided, and unsanitary handling by the operator is rendered unnecessary.

Other objects of my invention are to provide improved apparatus enabling rapid cooking and substantially immediate service of frankfurters and the like on demand; to provide apparatus which is relatively small and compact and correspondingly inexpensive to construct and operate; and to provide an apparatus which is attractive in appearance and may be advantageously operated in full view of the purchasers of the products cooked thereby. Further objects and advantages of the invention will be made evident by the following description, taken in connection with the accompanying drawings which illustrate preferred forms of apparatus for practicing the invention.

In the drawings,

Figure 1 is a longitudinal section through a straightening means showing a frankfurter in straightened position therein and a carrying pin inserted into the frankfurter;

Figure 2 is a cross section of the same arrangement, taken on the line 2—2 of Figure 1;

Figure 3 is a longitudinal vertical section through one form of cooking apparatus;

Figure 4 is a top plan view of the apparatus shown in Figure 3;

Figure 5 is a horizontal section taken on the line 5—5 of Figure 3, in the direction of the arrows;

Figure 9 is a diagrammatic illustration of the circuit connecting the heating elements and motor of the apparatus shown in Figures 3 to 7 with a power source;

Figure 10 is a vertical section through another form of cooking apparatus;

Figure 11 is a front elevation of the apparatus shown in Figure 10; and

Figure 12 is a section taken on the line 12—12 of Figure 10, in the direction of the arrows.

In the practice of my invention, I first straighten the object to be cooked and, while holding it in straightened position, pierce or impale it with a carrying pin, or spit, so that the object may be carried by the pin and maintained in a predetermined position. The pin and object carried thereby are then placed on a support which holds them and feeds them to the cooking apparatus. Any number of pins may be so positioned. They are picked up one by one by the cooking apparatus, conveyed through a heating zone of sufficient intensity to cook the objects during their passage through this zone, and finally discharged onto a receiving support in condition for use. An important feature of the invention consists in the rotation of the straightened objects carried by these pins during their travel through the heating zone.

It is customary in the serving of products such as frankfurters to enclose the cooked frankfurters within split, elongated rolls. Another feature of an embodiment of my invention consists in the provision of means for supporting and warming or toasting the bread or roll to be used with the cooked frankfurter in the customary fashion, which means is arranged with reference to the cooking apparatus so that the heating elements of the latter provide sufficient heat to warm or toast the bread or roll during the cooking of the frankfurters.

Figure 8:
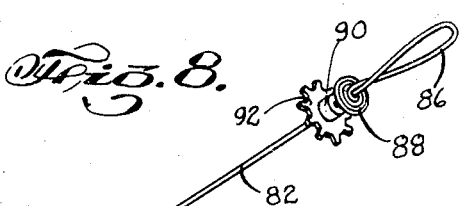
Figure 8 is a perspective view of a carrying pin, or spit, for use with the cooking apparatus.

The preliminary shaping or straightening operation, and the arrangement of the object, for example, a frankfurter, on the carrying pin are effected by the use of apparatus such as that shown in Figures 1, 2 and 8 of the drawings.

In Figures 1 and 2, I illustrate a suitable straightening means comprising a pair of similar block-like sections 140 and 142 which are connected by hinges 144 to swing together so that their faces abut, or to be separated as desired. The meeting faces of these sections 140 and 142 are provided with open grooves or recesses 146 and 148, respectively. These are in registry when the sections are swung together, and they cooperate to form a bore of a size and shape corresponding to the size and shape of the straightened frankfurter. The grooves or recesses 146 and 148 do not extend the entire length of the sections, but terminate in advance of one end thereof as shown at 150 and 152. Between the ends of these grooves and the proximate ends of the sections, the meeting faces of the sections are provided with smaller, semicylindrical registering grooves, 154 and 156, which cooperate to form a small bore of a size to receive and guide the shank of a carrying pin, or spit.

Referring particularly to Figures 1 and 8, an illustrative form of a suitable carrying pin is designated 82. This pin comprises an elongated shank having a pointed end 84, a handle 86 at the opposite end, a guard 88 adjacent the handle 88, and a member 90 carrying a toothed wheel 92 spaced from the guard 88 to provide a bight portion 94. The functions of the toothed wheel 92, guard 88 and the bight 94 will be made apparent hereinafter.

By the use of the apparatus above described, preliminary straightening of the frankfurter and arrangement thereof on a carrying pin take place as follows: The sections 140 and 142 of the straightening means are swung open to provide access to the grooves 146 and 148 therein. A frankfurter is placed in the groove of one section, and the two sections are then brought together so that the frankfurter is required to assume a shape corresponding to the shape of the bore formed by grooves 146 and 148. While the frankfurter is so held, a pin 82 is inserted into the small bore formed by grooves 154 and 156, and thence into the larger bore and through the frankfurter. The small bore guides the penetrating point 84 of the pin so that it accurately pierces the frankfurter through the center thereof. When the wheel 92 on the pin 82 abuts the ends of the sections 140 and 142, the frankfurter is properly centered and positioned on the pin, whereupon the sections are moving apart and the pin and frankfurter are lifted together therefrom by the handle 86 and thus carried to the cooking apparatus.

The entire straightening and piercing operations are very simple and require little time. Also, products unlike frankfurters may be similarly shaped or straightened and impaled by appropriate modification of the large bore between the two sections of the straightening means.

The cooking of objects placed on the carrying pins 82 may be effected by the use of apparatus constructed in accordance with my invention as follows:

One form of such apparatus is illustrated in Figures 3 to 7, inclusive. On a base 10 having a bracket 12 and a standard 14 at each end I support the cooking mechanism, indicative generally at 16, and the toasting rack 18 so that the two are subjected simultaneously to the influence of the heating elements hereinafter described.

The cooking mechanism 16 includes a housing formed by front and rear walls 20 and 22, end walls 24 and 26, and top and bottom walls 28 and 30, these walls being fastened together and to the base 10 by appropriate fastening means. Within the housing are enclosed the driving motor 32, connected with a reduction gear 34 and a pinion 36, and switch boxes 38 having control knobs 40 and 42 extending through openings in the wall 22 for controlling the motor and heating elements. The motor 32 is connected to a power source by a cable 44 which enters the housing through an opening 46 in the base 10 and bottom wall 30.

Figure 6:
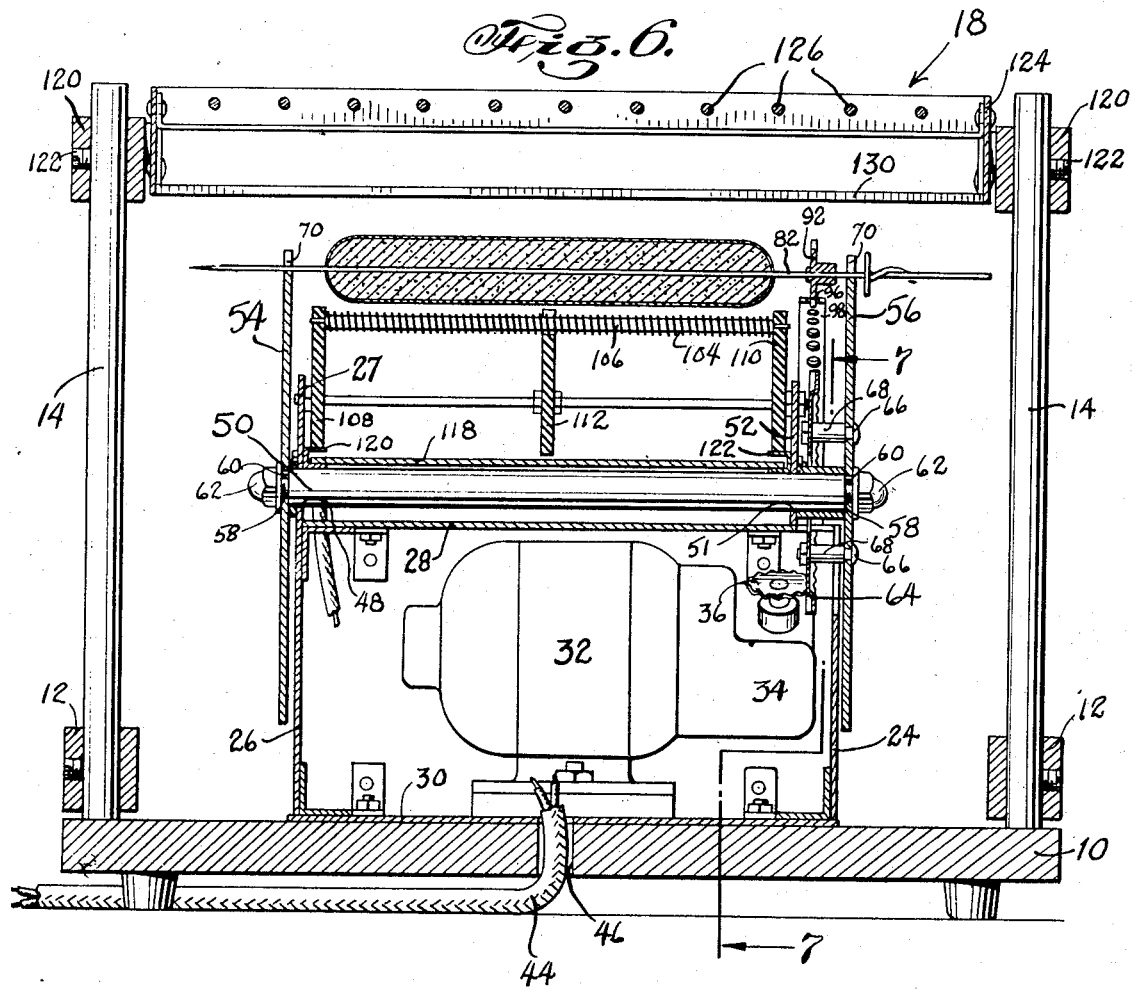
Figure 6 is a vertical cross section on the line 6—6 of Figure 3.

As shown in Figure 6, the end wall 26 is extended upwardly at 27 beyond top wall 28 and provided with a bore 48 in which one end of the shaft 50 is journalled. Shaft 50 extends across the top of wall 28 and has its opposite end journalled in bore 51 in plate 52 which is secured to wall 28 and is of a size and shape similar to the extended portion 27 of wall 26. Both ends of shaft 50 project beyond their respective journalling members and both carry disc-like conveying members 54 and 56, respectively, which fit over threaded ends 58 of the shaft and have openings to receive offset pins 60, integral with the shaft, so that both discs are required to rotate with the shaft. The discs 54 and 56 are held in place by appropriate means such as the capped nuts 62.

Figure 7:
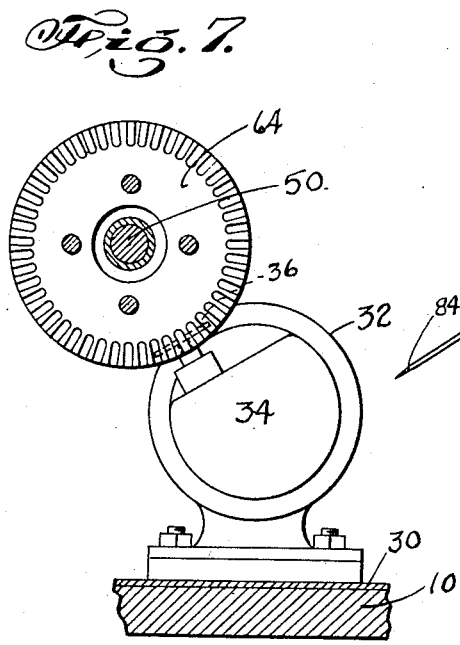
Figure 7 is a detail showing of the driving arrangement as viewed from the line 7—7 of Figure 6.

Rotation of the disc-like conveying members 54 and 56 is effected, as shown in Figure 7 and the right-hand side of Figure 6, by the pinion 36, which meshes with a gear wheel 64 fixed to member 56 by a plurality of fastening elements 66. These fastening elements are elongated to accommodate tubular spacers 68, which hold the wheel 64 and member 56 in spaced relation. Top wall 28 and end wall 24 of the housing are cut away so that the gear wheel 64 may extend into the housing in operative engagement with pinion 36, while the conveying member 56 remains in full view outside the wall 24.

From the foregoing description, it is apparent that energization of the motor 32 causes rotation of the gear wheel 64 through the medium of reduction gear 34 and pinion 36, and that rotation of wheel 64 results in simultaneous rotation of the conveying members 54 and 56 and the shaft 50.

The periphery of each disc-like conveying member is formed with a plurality of outwardly opening slots 70 adapted to receive and retain the carrying pins 82 with the frankfurters or other objects to be cooked impaled on the pins. The conveying members are arranged on shaft 50 so that the slots of the two members are in horizontal alignment. In the illustrated embodiment, wherein the conveying members rotate clockwise as viewed in Figure 3, the backward side of each slot is provided with a projecting lip 72 for a purpose to be described below.

Extending backwardly and upwardly from the rear side of the apparatus is a pair of parallel feeding arms 74 and 76 which are secured, respectively, to a bracket 78 between plate 52 and conveying member 56, and to the upwardly extended portion 27 of wall 26. To the arm 74 is fastened a positioning member 80. The arm 74 is arranged adjacent the inside of the conveying member 56, while the member 80 is spaced from arm 74 adjacent said carrying member and lies outside the same, as shown in Figure 5.

These feeding arms 74 and 76 hold one or more frankfurter carrying pins 82 with frankfurters impaled thereon and feed the same one by one to the conveying members, which pick them up, convey them through a heating zone where they are cooked, and then discharge them onto a receiving support.

The carrying pins 82 are of sufficient length to more than span the arms 74 and 76 and to be picked up and carried by pairs of registering slots 70 in the conveying members 54 and 56, but short enough to pass lengthwise between the standards 14. When placed on the arms 74 and 76 with the bight portions 94 expanding arm 74 and positioning member 80 the pins gravitate toward the conveying members 54 and 56 and are maintained in proper position to be picked up successively by a pair of lips 72 on the respective conveying members and retained by a pair of slots 70 communicating with said lips as the conveying members travel to the front side of the apparatus.

When the carrying pins 82 are picked up by the conveying members as above described, the teeth of the wheels 92 thereon engage in perforations 96 in a fixed, arcuate strip 98. The strip 98 is secured to the top wall of the housing adjacent the front and rear sides thereof and lies next to but outside the plate 52. The effect of this arrangement is to cause rotation of the pins 82 and the frankfurters thereon as they are conveyed through the heating zone.

When the pins carried by members 54 and 56 reach the forward side of the apparatus the leading sides of the slots 70 move progressively downward, and the pins ultimately drop from the slots onto the aforementioned receiving support, which consists of a pair of receiving members 100 and 102 attached to the housing adjacent the side walls thereof and spaced to support both ends of the pins while suspending the frankfurters therebetween.

While I have illustrated the slots 70 as being of a simple U-shape, it is apparent that they may be formed in any manner capable of picking up the pins 82, carrying them through the heating zone with their toothed wheels 92 in engagement with the perforated strip 98, and discharging them on the receiving support.

Cooking of the frankfurters conveyed by members 54 and 56 is effected by a plurality of heating elements 104, which, in the instant embodiment, are parallel electrical resistance coils. Each of these coils surrounds a core 106 of heat resistant material, and their ends and intermediate portions are supported on slabs 108, 110 and 112 of similar material, such as asbestos. The entire assembly is connected to the upwardly extended portion 27 of wall 26 and to the plate 52 by tie rods 114 and 116.

Below the coils 104, between slabs 108, 110 and 112 and the shaft 50, I provide a plate-like reflector member 118 which is removably held in place by a pair of channeled members 120 and 122. These channel members are open at their front ends to allow withdrawal of member 118 for cleaning purposes.

The reflector member 118 performs two functions. It reflects heat from the coils 104 upwardly onto the frankfurters carried by pins 82 and onto the toasting rack 18 at the top of the standards 14. It also catches any juices which drip from the cooking frankfurter and prevents soiling of the shaft 50 and the top wall 28 of the housing thereby.

Referring to Figure 9 of the drawings, the coils 104 are connected in series and controlled by switch member 42. The motor 32 is connected in the same circuit as the coils and is controlled by a second switch 40. By the use of this arrangement, the coils may be energized independently of the motor by closing switch 42; hence they may be brought to a suitable heat before starting the conveyor. Upon the closing of switch 40 the motor also is energized, which results in movement of the conveyor.

As an additional feature of the described embodiment I subject the bread or rolls to be used with the cooked objects to the influence of the heat in the heating zone during cooking of the objects. This is accomplished by the use of a toasting rack 18, which fits over and is adjustably secured to the standards 14 by oppositely disposed brackets 120 and set screws 122. The rack may be of any construction which will hold the bread or rolls while permitting the radiation of heat thereto from the heating elements 104. In the illustrated form, I use an open rectangular frame 124 across the top of which are a plurality of spaced supporting rods 126 adapted to support the bread or roll, indicated diagrammatically at 128 in Figure 3, with a side to be warmed or toasted facing downwardly. Several baffle members are pivotally attached to the end walls of frame 124 beneath the rods 126. These baffle members are manually adjustable by varying their inclination with respect to horizontal to vary the degree of heating of the bread supported by the rack.

From the foregoing description it is apparent that the cooking apparatus illustrated in Figures 3 to 7, inclusive, embodies a number of improved features. In using it the frankfurters or other objects are maintained in a proper, straightened position throughout the cooking operation. Thus uniformity of cooking is promoted, and the objects are prevented from curling and cracking under the influence of the heat in the heating zone, so that loss of valuable juices is avoided. Rotation of the objects during their passage through the heating zone causes them to be cooked with complete uniformity on all sides. Moreover, since the objects are continuously rotated, they may be arranged very close to the heating elements without danger of burning. So it is that the apparatus of my invention is small, simple and compact, and the period of exposure of the frankfurters to the heating elements, because of the intensity of heating, is short. The practice of the method of my invention requires no contact with the frankfurters by the hands of the operator and the cooking operation requires no attention by the operator to prevent burning and to assure perfectly and uniformly cooked products.

It is apparent that the apparatus herein described is merely illustrative, and that various modifications thereof are comprehended within the spirit and scope of the invention.

In Figures 10 to 12, inclusive, I illustrate another form of cooking apparatus constructed according to my invention. In this embodiment I provide a cabinet 200 having a bottom wall 202, a back wall 204, side walls 206 and 208, and an upwardly and backwardly inclined front wall 210 which terminates short of the bottom wall 202 to provide an opening 212 for feeding frankfurters to and receiving them from the apparatus.

Extending from the front of the cabinet 200 into the opening 212 are a pair of similar, spaced guides 214 and 216, which are spaced apart sufficiently to support carrying pins 82 with the frankfurters thereon suspended between the guides. Each guide comprises a backwardly and downwardly inclined edge 218 upon which the pins 82 are placed to be fed into the cabinet, and a forwardly and downwardly inclined edge 220 which receives the pins from a conveyor and feeds them, with cooked frankfurters thereon, to the front of the cabinet. The front of the cabinet adjacent the bottom thereof is formed with a portion projecting across the front ends of edges 220 to limit forward movement of pins carried by said edges, as indicated at 222.

The conveying means for the pins 82, in this embodiment, is of the endless chain type. Two chains 224 and 226 are arranged in spaced relation on pairs of sprockets 228 and 230. The sprockets 228 are fixed to a shaft 232 in the lower part of the cabinet. The sprockets 230 are mounted for rotation on a shaft 234, located adjacent the top of the cabinet. The arrangement of sprockets and chains is such that the conveyors travel in an inclined path substantially parallel to the inclined front wall 210 of the cabinet.

Movement of the conveyor chains is effected by a motor 236 which is mounted in the cabinet behind the chains, on angle brackets 238, and connected to drive the shaft 232 through worm 240 and gear 242. By this means shaft 232 is driven clockwise as viewed in Figure 10; hence the sprockets also rotate clockwise, and chains 224 and 226 travel upwardly along the front sides of the sprockets and downwardly along the back sides thereof.

Each conveyor chain is provided with a plurality of spaced pin-carrying members 244 which are fixed to the chains at their inner sides as shown in Figure 12. The members 244 on the two chains are in horizontal alignment. They are formed to extend beyond the plane of the chains, and they include outwardly opening mouths 246 having upper and lower lips 248 and 250.

It is apparent that movement of the conveyor chains 224 and 226 causes successive pairs of the pin-carrying members 244 thereon to pass by the feeding edges 218 of guides 216, and that when carrying pins 82 are present at the backward parts of edges 218 they are successively engaged by lips 250 of said members 244 and picked up by said members to be conveyed through the cabinet. The lips 250 of members 244 support the pins during their upward travel along the front sides of the sprockets, and as the chains turn over sprockets 230 to begin their downward travel, the pins 82 are supported by lips 248. When the members 244 reach the lower sprocket, however, they are again turned, and the pins carried thereby are discharged onto the receiving edges 220 of guides 216.

During their upward travel through a heating zone the pins 82 on members 244 are caused to rotate by engagement of toothed wheels 92 thereon with a stationary perforated strip 252 which is fixed to the wall 208 of the cabinet and extends inwardly from said wall the proper distance from chain 224 to receive the teeth of wheels 92 on the pins. The pins 82 are positioned on guiding edges 218 so that their toothed wheels 92 will be caused to register with the perforated strip 252 by a horizontal slot 254 in the side wall 208. This slot receives the bight portions 94 of the pins so that guards 88 remain outside the wall 208 and members 90 inside this wall; hence the wall 208 acts to position the pins for rotation during their upward travel.

The perforated strip 252 extends parallel to the conveyor chain 224 as far as it is desired to maintain rotation of the pins 82. The horizontal slot 254 communicates with a slot 256 in wall 208, and this slot follows the path of movement of pins 82 carried by the conveyor throughout their travel inside the cabinet.

In the form of apparatus illustrated in Figures 10 to 12, I employ gas heating elements instead of electrical heating elements such as those shown in Figures 3 to 6. The heating zone is located in the front of the cabinet, although other arrangements would be satisfactory. Closely adjacent to the frankfurters carried by the forward sides of the conveyor chains I place a wire screen 260, upon which a plurality of flames 262 from orifices in gas-conducting pipes 264 are directed. Pipes 264 are located between the screen 260 and the front wall 210 of the cabinet, and they communicate with a header, valve, and supply pipe in a conventional manner. The front wall 210 is provided with a layer of heat insulating material 266, in order to conserve heat generated by the gas burners and to prevent excessive heating of the atmosphere surrounding the cabinet.

When the burners are ignited and flames 262 play upon the screen 260, the latter quickly becomes red hot, and an intense heating zone is created adjacent thereto. The screen blocks the flames 262, however, and prevents them from burning or soiling objects carried adjacent thereto by the conveying means. Accordingly, it is possible, by use of this construction, to pass the frankfurters close to the screen 260 and to subject them to intense heating from gas flames, while continuous rotation of the frankfurters insures uniform cooking and prevents burning.

I provide for the catching of any juices which may drip from the frankfurters during the cooking operation by the use of an inclined plate 270 behind the front flight of the conveyor chains and extending across the cabinet. The plate 270 leads to a drawer-like receptacle 272, between the flights of the chains, into which juices dripping onto plate 270 are directed by the plate. Receptacle 272 rests on guides 274 and is removable endwise from the cabinet, as indicated at 276 in Figure 11, for cleaning purposes.

As in the form of apparatus first described, plate 270 preferably is provided with a reflecting surface to reflect heat radiated thereto backwardly onto the objects carried by the conveying means. This also prevents wasteful dissipation of heat from the screen 260 and avoids overheating of the remote parts of the cabinet.

While I have illustrated my invention by reference to specific forms of apparatus suitable for practicing the same, it is apparent that the invention is not limited thereto and that various modifications may be made without departing from the spirit of the invention, which should be construed broadly within the scope of the appended claims.

I claim:

1. In a machine for cooking objects such as frankfurters and the like, heating means, individual, freely movable carrying means for each object, means to receive and hold a plurality of said carrying means, conveying means operative to pick up said carrying means one by one from said receiving and holding means and to convey the same through a heating zone adjacent said heating means, and means whereby said carrying means and thereby the objects thereon away from said heating means are discharged from said conveying means after the former have passed through said heating zone.

2. Meat cooking apparatus comprising a support, an endless conveyer mounted on said support, means for holding meat carrying pins adjacent said conveyer, means on said conveyer operative to pick up pins from said holding means one by one and to carry the same with the conveyer, a heating zone in the path of movement of pins on said conveyer, heating means for heating said zone, means at another point adjacent said conveyer for receiving said pins from said conveyer, and means whereby the pins carried by said conveyer are released and dropped onto said receiving means after passage through said heating zone.

3. Meat cooking apparatus comprising a support, an endless conveyer mounted on said support, means for feeding meat carrying pins adjacent said conveyer, means on said conveyer operative to pick up pins from said feeding means one by one and to carry the same with the conveyer, a heating zone in the path of movement of pins on said conveyer, means operative by the movement of pins on said conveyer to cause rotation of said pins during movement through said heating zone, and means to release said pins from the conveyer after passage through said zone.

4. Meat cooking apparatus comprising a support, an endless conveyer mounted on said support, means for feeding meat carrying pins adjacent said conveyer, means on said conveyer operative to pick up pins from said feeding means, one by one and to carry the same with the conveyer, a heating zone in the path of movement of pins on said conveyer, means operative by the movement of pins on said conveyer to cause rotation of said pins during movement through said heating zone, means to release said pins from the conveyer after passage through said zone and means in said heating zone for holding and heating bread or the like during the passage of said pins through said zone.

5. In combination, a support, spaced standards thereon, an endless conveyer between said standards, feeding means adjacent one side of said conveyer for feeding carrying pins to said conveyer, means on said conveyer to pick up said carrying means one by one, receiving means adjacent another side of said conveyer for receiving said pins therefrom, heating means between said feeding means and said receiving means for creating a heating zone in the path of pins conveyed by said conveyer, means operative by movement of said conveyer to rotate pins conveyed thereby during passage of said pins through said heating zone, and a rack supported on said standards above said conveyer and in the zone of heat from said heating means.

6. In combination, a support, spaced standards thereon, an endless conveyer between said standards, feeding means adjacent one side of said conveyer for feeding carrying pins to said conveyer, means on said conveyer to pick up said carrying means one by one, receiving means adjacent another side of said conveyer for receiving said pins therefrom, heating means between said feeding means and said receiving means for creating a heating zone in the path of pins conveyed by said conveyer, means operative by movement of said conveyer to rotate pins conveyed thereby during passage of said pins through said heating zone, and a rack supported on said standards above said conveyer and in the zone of heat from said heating means, said rack including adjustable shutters whereby the amount of heat passing therethrough may be varied.

7. In a cooking apparatus, heating means for creating a heating zone and a pair of spaced conveying members movable adjacent thereto, each of said members having peripheral, outwardly opening slots thereon, the slots of said members being in horizontal alignment, spaced supports adjacent said members for holding elongated carrying elements, said supports inclined toward said members whereby said elements gravitate to the conveying members and said slots having projected lips whereby successively to pick up said elements upon movement of the conveying members past said supports and to convey them through said heating zone.

8. In a cooking apparatus, a pair of spaced conveying members having peripheral, outwardly opening slots thereon, the slots of said members being in horizontal alignment, spaced supports adjacent said members for holding elongated carrying elements, said supports inclined toward said members whereby said elements gravitate to the conveying members, said slots having projected lips whereby successively to pick up said elements upon movement of the conveying members past said supports, and means adjacent one of said conveying members engaging means on said carrying elements whereby movement of said members causes rotation of the carrying elements conveyed thereon.

9. In apparatus for cooking frankfurters and the like, conveyer means including a pair of spaced conveying members, a pair of supporting and feeding arms adjacent said conveying members to hold a plurality of elongated carrying elements with frankfurters thereon between said arms and to feed the same to said members, means on said members to pick up said elements one by one from said supporting and feeding arms and to convey the same through a heating zone, a stationary perforated strip adjacent one of said members and extending longitudinally of the path of travel of said members, and said carrying elements each having a toothed wheel thereon, the teeth thereof being in registry with the perforations of said perforated strip when said elements are conveyed by said members, whereby movement of said members causes rotation of said elements and of the frankfurters carried thereby.

KARL LEOPOLD ZERR.